H. S. CLEVELAND.
COOKING STOVE.
APPLICATION FILED JULY 1, 1908.
918,734.
Patented Apr. 20, 1909.
2 SHEETS—SHEET 1.
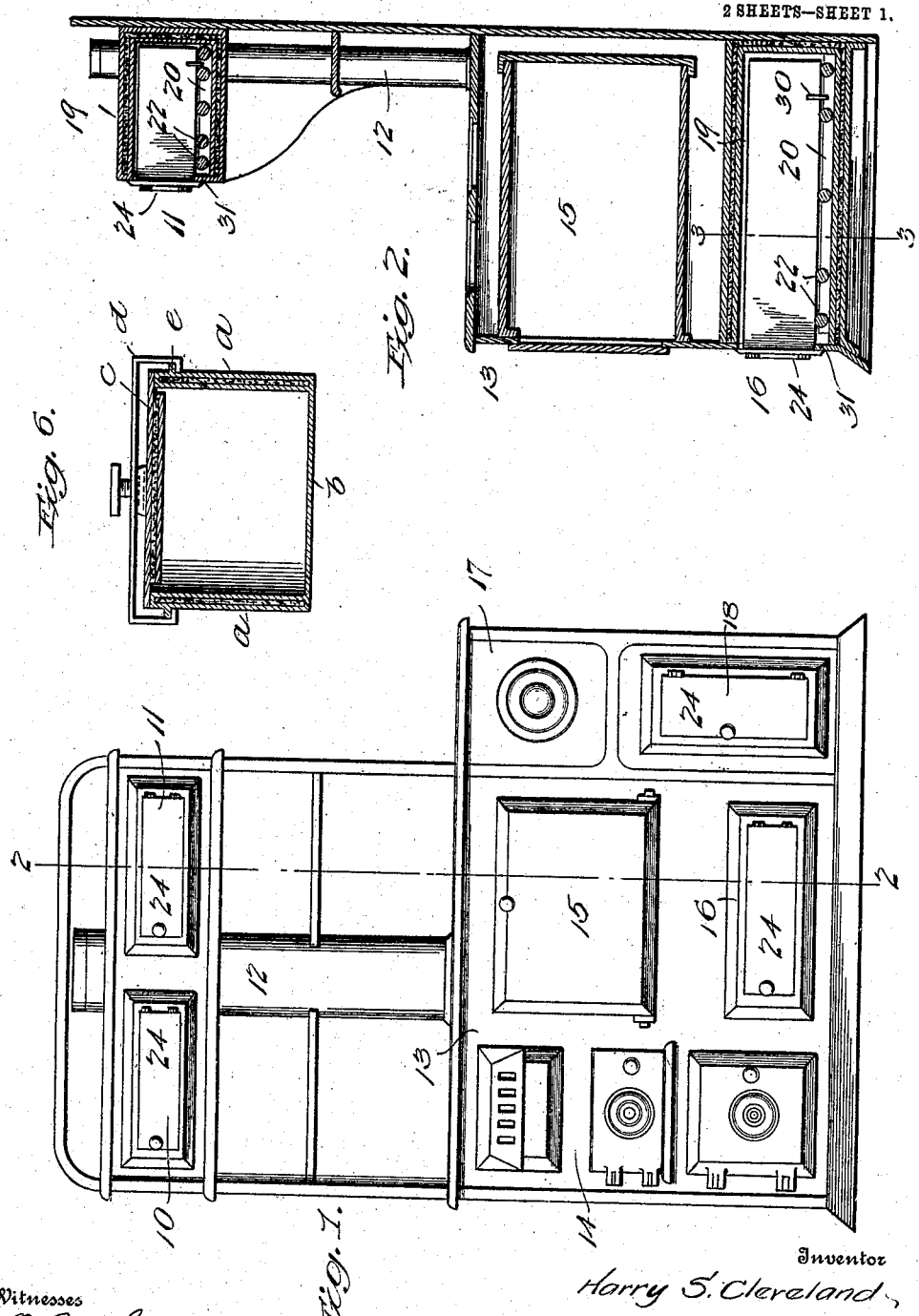
Witnesses
E. O. Crocker.
R. C. Braddock
Inventor
Harry S. Cleveland,
By D. Lloyd Macdonell
Attorney

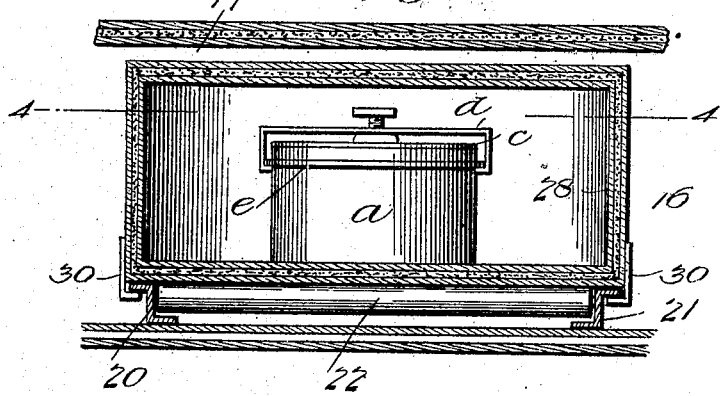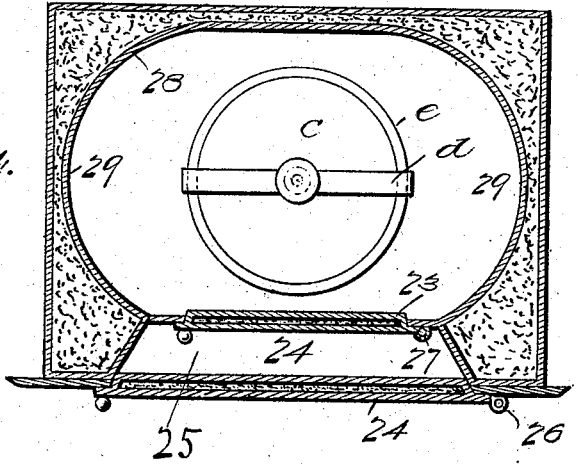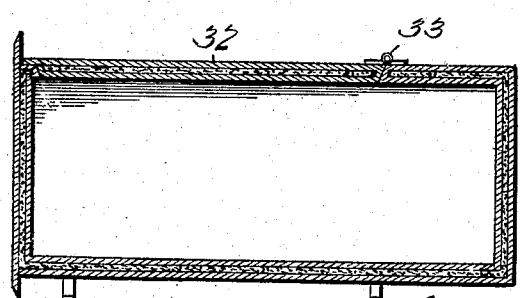

UNITED STATES PATENT OFFICE.

HARRY S. CLEVELAND, OF FARIBAULT, MINNESOTA, ASSIGNOR OF ONE-HALF TO CHARLES H. RODENBACH, OF CEDAR FALLS, IOWA.

COOKING-STOVE.

No. 918,734.  Specification of Letters Patent.  Patented April 20, 1909.

Application filed July 1, 1908. Serial No. 441,482.

*To all whom it may concern:*

Be it known that I, HARRY S. CLEVELAND, a citizen of the United States, residing at Faribault, in the county of Rice and State of Minnesota, have invented certain new and useful Improvements in Cooking-Stoves, of which the following is a specification.

This invention relates to cooking stoves or ranges, and has special relation to the type of stoves or ranges such as is shown and described in my co-pending application Serial No. 423,329, filed March 26th, 1908. In said co-pending application I have described and claimed a novel arrangement of warming closets for the stove or range which utilizes the heretofore waste spaces, and the present application has for its principal object to provide means which will readily facilitate the use of said closets so that access to the contents thereof may be had for inspection, removal, &c.

In carrying out the object generally stated above, it is contemplated preserving the same arrangement of closets, relative to the stove pipe, fire chamber and the usual baking oven, but instead of making said closets of the partitioned, rotary type, it is proposed mounting them in such a manner that they may be slid out from the stove when access is to be had thereto.

In the practical application of the invention, it will of course be understood that changes in structural arrangements and details may be resorted to, but a preferred and practical embodiment of the invention is shown in the accompanying drawings, in which—

Figure 1 is a front elevation of a cooking stove or range showing the general arrangement of the warming closets. Fig. 2 is a sectional view of the same taken on the line 2—2. Fig. 3 is a cross-sectional view on the line 3—3, Fig. 2. Fig. 4 is a horizontal sectional view on line 4—4, Fig. 3. Fig. 5 is a sectional view of a modified form of closet. Fig. 6 is a detail view of a form of cooking vessel specially adapted for use in connection with the present invention.

Like characters of reference refer to corresponding parts.

In the accompanying drawings a stove or range has been shown which is of the same general type as shown in my aforesaid co-pending application, provided with the two upper closets 10—11, one being on each side of the smoke pipe 12. The stove or range proper 13 has the usual fire compartment 14 at one side thereof, the central baking oven 15 adjoining the fire compartment 14, a warming closet 16 immediately below the baking oven 15, a water reservoir 17 adjoining the baking oven, and a warming oven 18 immediately below the said water reservoir 17.

It is to be understood at the outset that each closet is of the same construction, although there may be slight differences in the general shape thereof due to the space in the stove it occupies, and therefore it is thought that a description of one closet and the space in the stove it occupies will be sufficient for all the closets.

Referring more particularly to Figs. 2, 3 and 4, of the drawings, the spaces in the stoves occupied by the closets have been designated by the reference character 19, said spaces being closed at the top, bottom and inner end, said top, bottom and end being composed of two spaced apart metal sheets having an interposed sheet of insulating material. Each side of the bottom of the spaces carries an upstanding substantially Z-shaped track or runway 20—21 between the vertical portions of which are mounted a plurality of rollers 22, said rollers being arranged so that their surfaces will project slightly above the tops of the said tracks or runways.

The closets proper are preferably of a rectangular shape and are formed of spaced-apart metal sheets between which a sheet or layer of insulating material is interposed, and their fronts or entrances, are sealed through the medium of an inner and an outer door 23—24 respectively, said doors being sufficiently spaced apart to permit of an air space 25 being formed therebetween. Preferably said doors are formed of inner and outer sheets of metal and an interposed sheet of insulating material. The outer door 24 has a hinge connection 26 with the outside sheet of the closet, and the inner door has a similar connection 27 with the inner sheet of the closet. Preferably the inner sheet of the closet, designated by the numeral 28 has its ends of semi-circular shape, as at 29—29, which permits of the inner door 23 being considerably smaller than the outer door 24, so that the same may be readily opened.

The sides of the closets are provided with substantially L-shaped guiding and retaining lugs or keepers 30 which are arranged in a pendent position and engage with the under surface of the tops of the tracks or runways and serve to retain the said closets in contact with the rollers 22. Said guiding and retaining lugs or keepers 30 also serve to prevent the closets being drawn too far out by contacting with the upstanding flange 31 at the front of the closet space when the said closet is in its outermost position. To facilitate the placing of the closets in their space, the ends of the tracks 20—21 terminate adjacent to the upstanding flange 31 at the front of the said space, so that the retaining and guiding lugs or keepers may be dropped into their track or runway engaging position, as will be readily understood.

In Fig. 5 a modified form of closet has been shown, the mounting, or track-engaging features of which are the same as that described with reference to the preferred form of the invention, but instead of having access had to the interior through front doors, it is proposed having a top lid 32 hinged thereto as indicated at 33. As in the said preferred forms of the invention, the closet shown in Fig. 5 is composed of inner and outer sheets of metal and an interposed sheet of insulating material.

The stove or range above described possesses advantages for use in connection with the retaining of cooked or partially cooked articles in the vessels they have been cooked in, in which case the said articles are first given a preliminary cooking in the ordinary manner, and then removed from the stove and placed in the closets. Said closets being in such a position that they will be always in a warm condition, it will be readily understood that the same subserve all the functions of what is known as the "fireless cookers."

In Fig. 6 of the accompanying drawings a cooking utensil has been shown which is specially adapted for use in connection with the present invention. Said vessels or utensils being provided with heat insulating walls $a$, non-insulated bottom $b$, and insulated lid or cover $c$. Said cover $c$ being retained in position by a screw clamp $d$ which engages with flanges $e$ of the utensil wall.

Claims:

1. A cooking stove or range provided with a plurality of insulated warming closet spaces, supporting means in said closet spaces, and a warming closet in each of said spaces and provided with guides adapted to slidably engage with said supporting means.

2. A cooking stove or range provided with a plurality of warming closet spaces, a runway in each of said spaces, and a warming closet in each of said closet spaces and having depending guides adapted to slidably engage with said runway.

3. A cooking stove or range provided with a plurality of insulated warming closet spaces, tracks in said spaces, anti-friction devices mounted between said tracks, a warming closet in each of said spaces and supported upon said anti-friction devices, and guiding devices carried by said closets and slidably engaging said tracks.

4. A cooking stove or range provided with a plurality of insulated warming closet spaces, tracks or runways in each of said spaces, anti-friction rollers mounted between said tracks or runways, a warming closet in each of said spaces and supported upon said rollers, and a slidable connection between said closets and said tracks or runways.

5. A cooking stove or range provided with a plurality of insulated warming closet spaces, tracks or runways in each of said spaces, anti-frictio rollers mounted between said tracks or runways with their surfaces projecting above the tops of said tracks or runways, a warming closet mounted in each of said spaces and supported by said rollers, and retaining and guiding lugs or keepers carried by said closets and slidably engaging with said tracks or runways.

6. A cooking stove or range provided with a plurality of insulated warming closet spaces, tracks or runways in each of said spaces, a warming closet in each of said spaces, a slidable connection between said closets and said tracks or runways, said closets being provided with inner and outer spaced apart doors forming an air space between them.

7. A cooking stove or range provided with warming closet spaces, warming closets slidably mounted in said spaces, said closets being formed of inner and outer spaced apart metal sheets having insulating material interposed between them, and inner and outer doors carried by said spaced apart sheets and arranged to have an air space between them.

In testimony whereof I affix my signature in presence of two witnesses.

HARRY S. CLEVELAND.

Witnesses:
J. W. LECRONI,
R. A. MOTT.